United States Patent [19]
Brochard et al.

[11] Patent Number: 4,916,882
[45] Date of Patent: Apr. 17, 1990

[54] MEMBER FOR CONNECTING PANELS

[75] Inventors: Jean P. Brochard, Rocheville le Cannet; Pierre Laithier, Nice; Jean A. Massoni, Cannes la Bocca, all of France

[73] Assignee: Société Anonyme dite: Aerospatiale Societe Nationale Industrielle, Paris, France

[21] Appl. No.: 387,843

[22] Filed: Aug. 1, 1989

[30] Foreign Application Priority Data

Aug. 25, 1988 [FR] France .................. 88 11221

[51] Int. Cl.$^4$ .............................................. E04C 2/54
[52] U.S. Cl. ...................... 52/787; 403/241; 403/405.1
[58] Field of Search ............... 403/405.1, 241; 52/787, 52/815, 821, 822, 823

[56] References Cited

U.S. PATENT DOCUMENTS

| | | | |
|---|---|---|---|
| 3,874,133 | 4/1975 | Silvius | 52/582 X |
| 3,880,535 | 4/1975 | Durham | 403/241 |
| 4,296,586 | 10/1981 | Heurteux | 52/787 |

FOREIGN PATENT DOCUMENTS

| | | |
|---|---|---|
| 0011026 | 5/1980 | European Pat. Off. . |
| 7833259 | 6/1985 | Fed. Rep. of Germany . |
| 8618002 | 10/1987 | Fed. Rep. of Germany . |
| 2510681 | 2/1983 | France .................. 403/405.1 |

Primary Examiner—Andrew V. Kundrat
Attorney, Agent, or Firm—Fisher, Christen & Sabol

[57] ABSTRACT

This invention relates to a member for connecting panels comprising a central core covered by sheets, wherein said member comprises two small plates parallel to each other and connected to each other by a transverse connecting lug, and which are adapted to fit by their inner faces on the respective sheets of said panel, the distance separating the inner faces of the small plates corresponding substantially to the thickness of said panel. Each inner face presents a recess capable of being filled with an adhesive bonding said small plate to the corresponding sheet, while the outer face of each small sheet presents ribs thanks to which each of said small plates, even subjected to efforts at right angles to said panel, is applied uniformly against the corresponding sheet of said panel, means for fixing an adjacent panel or specific equipment being provided in said connecting lug.

11 Claims, 1 Drawing Sheet

MEMBER FOR CONNECTING PANELS

FIELD OF THE INVENTION

The present invention relates to a member for connecting panels, particularly multi-layer ones, or the like.

More particularly, but not exclusively, the connecting member according to the invention is advantageously appropriate for assembling the edges of so-called "sandwich" panels which comprise a central core presenting, for example, a so-called honeycomb structure covered on its faces by sheets or plates.

These connecting members are preferably applicable in the spatial domain and, more precisely, in the connection of the sandwich panels of artificial satellites and/or the fixing of specific equipment to a panel.

BACKGROUND OF THE INVENTION

The connecting members used at the present time are generally constituted by added pieces, called inserts, which are integrated in the panel when it is manufactured. Although very widely adopted by the manufacturers, such products nonetheless present drawbacks.

Firstly, it is necessary, on the one hand previously to define the location of each insert to be added in the panel and, on the other hand, to design specific tools for positioning said inserts in order to maintain them in place during manufacture of the panel, which, due to the study and manufacture of said tools, involves increased production costs of the panels and, due to the pre-established location of the inserts, the impossibility of changing their location in the panel.

Furthermore, these inserts, added during actual manufacture of the panel which is effected by hot gluing the plates on the honeycomb structure, are also hot-glued with the aid of an appropriate adhesive on the walls of the bores made in the plates and the structure of the panel Consequently, when the inserts present, in particular, a considerable length corresponding substantially to that of the thickness of the panel and when the nature of the materials used for the insert, the plates and the honeycomb structure is different, problems of differential expansion appear between the materials used, since each presents its own coefficient of thermal expansion.

It is an object of the present invention to overcome these drawbacks by providing a member for connecting panels, particularly multi-layer ones, whose design avoids the use of specific tools for fitting it to a panel, whilst eliminating the problems inherent to the differences of thermal expansion of the materials, and which presents a good mechanical resistance, a low mass, and reduced manufacturing and installation costs.

SUMMARY OF THE INVENTION

To that end, the member for connecting panels, particularly multi-layer ones, of the type comprising at least one central core covered by sheets, is noteworthy, according to the invention, in that it comprises at least two small plates of oblong shape, parallel to each other and connected to each other by a transverse connecting lug, and which are adapted to fit by their inner faces on the respective sheets of said panel, the distance separating the inner faces of the small plates corresponding substantially to the thickness of said panel and each of the inner faces presenting at least one recess capable of being filled, thanks to an orifice made in the small plate and opening in said recess, with an adhesive then bonding said small plate to the coresponding sheet, whilst the outer face of each small sheet presents ribs thanks to which each of said small plates, even subjected to efforts at right angles to said panel, is applied substantially uniformly against the corresponding sheet of said panel, and in that means for fixing to an outside device are provided in said connecting lug.

Thus, thanks to the invention, a plurality of connecting members may be distributed on the edges of a panel after the latter has been produced, and no longer in the panel itself during manufacture thereof. The small plates of each member are fitted, to within the manufacturing tolerances, on the sheets of said panel, whilst the connecting lug of each member may come into contact, for example, with the edge of the panel. Consequently, the design of each member makes it possible to dispense with the specific tools previously used, whilst offering the possibility of being disposed at any spot on the periphery of said panel, since the incorporation of the adhesive in the recesses of the small plates is effected only after having arranged said member at their chosen locations.

On this subject, as each member is glued cold on the panel and such gluing is effected only on the sheets of said panel, after manufacture thereof, the problems of thermal expansion, mentioned above, no longer appear.

An outside device such as an adjacent panel may therefore easily be connected via the fixing means provided to that end in the connecting lug of said small plates, or specific equipment directly fixed to said fixing means.

Furthermore, according to another advantage procured by said connecting member of the invention, since the outer faces of the small plates present ribs, the latter make it possible in particular, when the panel is subjected to various stresses, to distribute the efforts substantially over the whole surface of the small plates, with the result that the shearing forces then exerted on the central core of the panel, such as a honeycomb structure, are balanced.

Said small oblong plates are advantageously arranged so that their large side is parallel to the edge of said panel. In a preferred embodiment, the central part of said small plates presents, with said transverse connecting lug joining them, a U-section. In this way, a connecting member is thus assembled on the edge of a panel without difficulty since it consists simply in inserting the inner faces of the small plates between the outer sheets of the edge of the panel, the distance separating said inner faces advantageously corresponding, to within the functional clearances, to the thickness of said panel.

According to another feature of said connecting member, said recess provided in the inner face of each small plate may be in the form of a groove disposed along the large side of the small plate. Each groove thus performs the role of reservoir for adhesive product, thus making it possible to introduce the adhesive in the groove after said member has been correctly placed at the desired location.

Furthermore, the ribs made on the outer face of each small plate may be in the form of a cross. In that case, said ribs of each small plate are advantageously perpendicular to one another, the intersection of said grooves being located at the centre of the outer face of each small plate and each of said ribs being disposed along one of said sides of said small oblong plate In this way, thanks to this arangement of the ribs, the above-mentioned stressess to which said panel may be subjected are optimally distributed substantially over the whole surface of the two small plates, being distributed, via the adhesive, uniformly and in balanced manner, over the sheets and the honeycomb structure.

According to another feature of the invention, said fixing means provided in said connecting lug may be constituted by at least one tapped hole. Thus, for example, a threaded rod connected to a support of a specific equipment is in that case simply screwed in said tapped hole, a nut or the like ensuring blocking of the connection thus established.

Furthermore, at least one bore or the like is provided in said connecting lug, in order to lighten said connecting member, which is particularly advantageous for the spatial domain.

Said small plates of the connecting lug advantageously form a unitary piece obtained, for example, by moulding.

The invention also relates to a panel, particularly a multi-layer one, of the type comprising at least one central core covered respectively on either side by sheets, noteworthy in that it presents a plurality of notches made in its edges and in each of which the connecting lug of the connecting member as defined hereinabove may be introduced.

BRIEF DESCRIPTION OF THE DRAWINGS

The invention will be more readily understood on reading the following description with reference to the accompanying drawings, in which.

DETAILED DESCRIPTION OF THE DRAWINGS

The member according to the invention is intended to connect two adjacent panels or to connect specific equipment to a panel.

Figure 1:
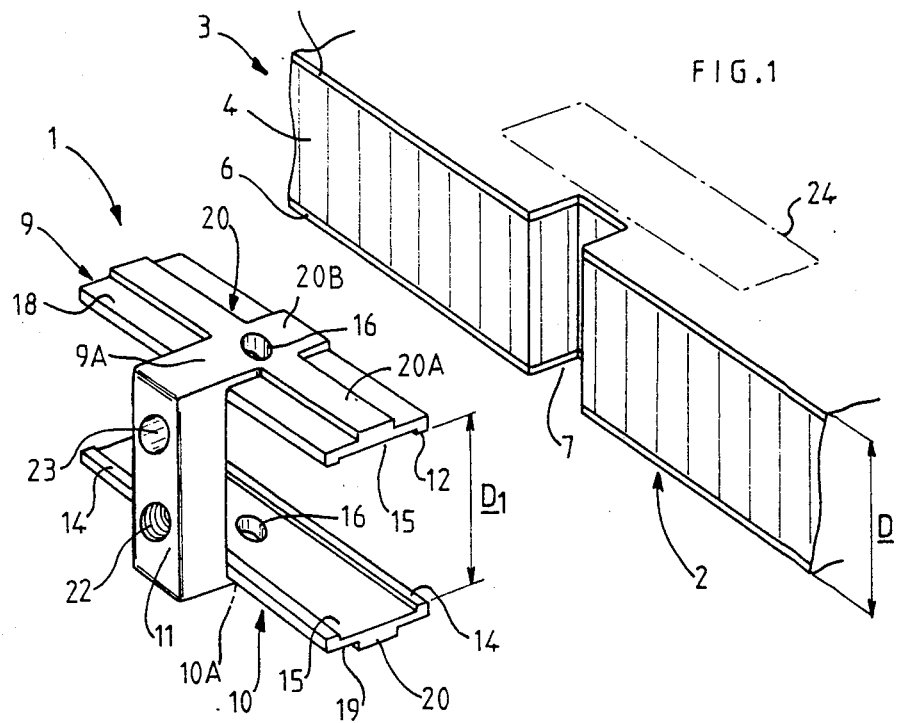
FIG. 1 shows in perspective the connecting member according to the invention before it is assembled on the edge of a sandwich-type panel.

Referring now to the drawings, FIG. 1 shows the connecting member 1 adapted to be added to a part of the edge 2 of a panel 3 which has been shown partially. This panel 3 is, in that case, a multi-layer panel comprising a central core 4, such as a honeycomb structure, covered on either side by upper and lower sheets 5 and 6 respectively.

Moreover, there is provided in the edge 2 of the sandwich panel 3 a notch 7 whose function will be explained hereinafter and which presents, in this embodiment, a U-section. Reference D designates the thickness of said panel 3.

The connecting member 1 shown in FIG. 1, comprises two small plates 9 and 10 of oblong shape, parallel to each other and connected to each other by a transverse connecting lug 11. These small plates 9 and 10 are, in the embodiment illustrated, identical and are intended, as will be seen with reference to FIGS. 2 and 3, to fit by their respective inner faces 12 and 14 on the respective upper and lower sheets 5 and 6 of the panel 3. To that end, the distance D1 separating said inner faces 12 and 14 is substantially identical to the thickness D of the panel 3.

The small plates 9 and 10 and the connecting lug 11 advantageously form a unitary piece obtained for example by moulding, the connecting member thus obtained being made of a metal or composite material.

FIG. 1 shows that the central part 9A and 10A, respectively, of the small plates 9 and 10 presents with the connecting lug 11 a U-section adapted to follow the shape of the corresponding part of the edge 2 of the panel 3. The oblong plates 9 and 10 are preferably arranged so that their large side is parallel to the edge 2 of said panel.

Furthermore, the inner faces 12 and 14, respectively, of the small plates 9 and 10, each present a recess 15, such as defined, in this embodiment, by a groove provided along the large side of the small plates. An orifice 16, made in each small plate 9 and 10, opens out in the corresponding groove 15. These grooves 15 are intended to perform the role of reservoir for an appropriate adhesive which, as will be seen with reference to FIGS. 2 and 3, will be introduced through orifices 16, into the grooves 15.

As to the outer faces 18 and 19, respectively, of the small plates 9 and 10, they each present ribs 20 projecting with respect to said outer faces. The ribs 20, particularly visible on the outer face 18 of the small plate 9, are arranged in the form of a cross and are disposed perpendicularly to one another. In this way the intersection of the ribs 20, provided on each small plate, is advantageously located at the centre of the outer face 18 and 19, respectively, of the small plates 9 and 10, said ribs being directed along the two sides of each oblong plate. In this way, a rib 20A is disposed along the large side (length) of each of the small plates, whilst a rib 20B is provided along the small side (width) thereof.

Apart from the fact that they rigidify the small plates, these ribs 20 enable the small plates 9 and 10 to be applied substantially uniformly on that part of the sheets 5 and 6 that they cover, even when the panel is subjected to stresses. In that case, on the honeycomb structure 4 are applied balanced forces which are uniformly distributed, and not localized, which would risk locally crushing the honeycomb structure.

According to another feature of said member 1, the transverse connecting lug 11 is provided with means for fixing an outer device (not shown) such as, for example, a panel adjacent panel 3 or equipment specific to said panel. These means are, for example, constituted by a tapped hole 22 made in said lug 11. Furthermore, in order to lighten said connecting member, a bore 23 or the like may be provided in said lug, which is particularly advantageous in the spatial domain for which said connecting members are more specifically intended.

Finally, the broken lines represent the zone 24 of each part of the sheets 5 and 6 intended to be glued by the adhesive deposited in the grooves 15.

Figure 2:
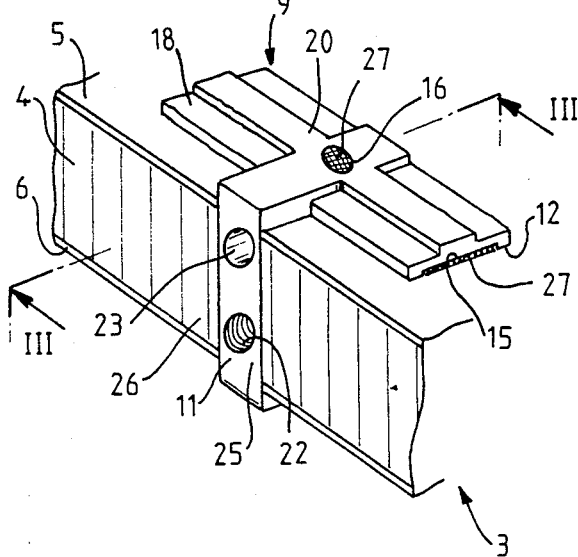
FIG. 2 shows in perspective the connecting member mounted on the edge of said panel.
Figure 3:
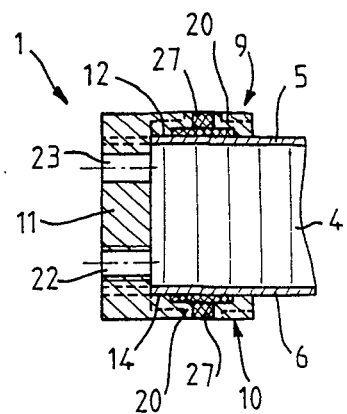
FIG. 3 is a transverse section of the connecting member fixed to the edge of the panel along the plane of section III—III of FIG. 2.

FIGS. 2 and 3 show the connecting member 1 fixed to the panel 3. Of course, a plurality of connecting members connected to the edges of said panel may be envisaged, depending on needs.

These Figures show the interest of the notch 7 made in the edge 2 of panel 3 and which makes it possible to position and maintain the connecting member 1. The connecting lug 11, whose section corresponds substantially to that of the notch, then fits perfectly in the notch 7, so that the outer face 25 of the lug is made flush with edge 2. The positioning of these notches is determined as a function of the chosen location of said connecting members.

It is easy to position the connecting member 1 on the edge of the panel 3, the inner faces 12 and 14 of the small plates 9 and 10 coming flush with the corresponding parts of the sheets 5 and 6, since the distance D1 separating said inner faces is substantially equal, to within the clearance, to the thickness D of the panel 3. After the member 1 is suitably positioned on the edge of the panel, the adhesive 27 is introduced in the orifices 16 made in the small plates 9 and 10, said adhesive then flowing in the grooves 15 provided in the inner faces 12 and 14 of the small plates. After drying of the adhesive 27 at ambient temperature, the connecting member 1 is firmly connected to panel 3.

It follows from the foregoing that the connecting member, by its simple design, presents a low mass, a good mechanical resistance, and its production, as well as installation, do not raise any difficulty. Moreover, it avoids, on the one hand, the use of complex and expensive specific tools and, on the other hand, since it is glued cold solely on the outer sheets of said panel after manufacture thereof, the problems of thermal expansion. Furthermore, said ribs allow the transfer of the efforts over the panel in substantially distributed and balanced manner. Finally, the connecting member according to the invention, apart from the fact that it connects for example two adjacent panels together, or specific equipment to said panel, may be added to a panel comprising pieces conventionally added to repair, for example, such a panel.

What is claimed is:

1. A member for connecting panels, particularly multilayer panels having one central core covered by sheets, comprising:
    at least two oblong small plates, having a small side and a large side, said plates being parallel to each other and having inner faces facing each other and outer faces;
    a transverse lug connecting said small plates to each other, and
    fixing means provided in said transverse lug, said small plates being adapted to fit by their inner faces on the respective sheets of one of said panels and the distance separating said inner faces corresponding substantially to the thickness of said panel, each of said inner faces having at least one recess communicating with the corresponding outer face through an orifice allowing said recess to be filled with an adhesive after positioning of said member on the edge of said panel, and said outer faces having rigidifying ribs allowing said small plates to be applied substantially uniformly against the corresponding sheet of said panel.

2. The member of claim 1, wherein said small oblong plates are arranged so that their large side is parallel to the edge of said panel.

3. The member of claim 1, wherein the central part of said small plates presents, with said transverse connecting lug, a U-section.

4. The member of claim 1, wherein said recess provided in the inner face of each small plate is in the form of a groove disposed along the large side of the small plate.

5. The member of claim 1, wherein the ribs made on the outer face of each small plate are in the form of a cross.

6. The member of claim 5, wherein said ribs of each small plate are perpendicular to one another, the intersection of said ribs being located at the centre of the outer face of each small plate and each of said ribs being disposed along one of said sides of said small oblong plate.

7. The member of claim 1, wherein said fixing means provided in said connecting lug are constituted by at least one tapped hole.

8. The member of claim 1, wherein at least one bore or the like is provided in said connecting lug.

9. The member of claim 1, wherein said small plates and the connecting lug form a unitary piece obtained by moulding.

10. A panel, particularly a multilayer panel having one central core covered by sheets, having at least one connecting member fixed thereon, said connecting member comprising:
    at least two oblong small plates parallel to each other and having inner faces facing said sheets of said panel and outer faces;
    a transverse lug connecting said small plates to each other; and
    fixing means provided in said transverse lug, the distance separating said inner faces corresponding substantially to the thickness of said panel and each of said inner faces having at least one recess communicating with the corresponding outer face through an orifice, and said outer faces having rigidifying ribs allowing said small plates to be applied substantially uniformly against the corresponding sheet of said panel, said recesses being filled with an adhesive and said transverse lug being disposed in a notch cut in the edge of said panel.

11. A member for connecting panels, particularly multilayer panels having one central core covered by sheets, comprising:
    a first oblong plate having an inner surface and an outer surface, said first plate having a length greater than its width;
    a second oblong plate having an inner surface and an outer surface, said second plate having a length greater than its width;
    a transverse lug connecting said first and second plates together, said plates being adapted to fit with their inner faces contacting with respective sheets of each panel with the distance separating the inner faces being substantially the same as the thickness of the panel, each plate having at least one recess in the inner face with a passageway extending from the recess to an outer face of the plate to allow adhesive to be injected through the passageway into the recess for adhering the plate to the panel, said outer faces of said plates having reinforcing ribs for applying the plates substantially uniformly against the sheets of the panels.

* * * * *